J. W. SCHATZ.
METHOD OF ASSEMBLING THE PARTS COMPOSING BALL BEARINGS.
APPLICATION FILED APR. 29, 1915.
1,176,170.  Patented Mar. 21, 1916.
Fig. 1.   Fig. 4.
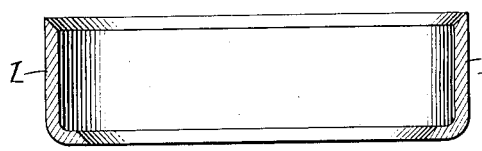 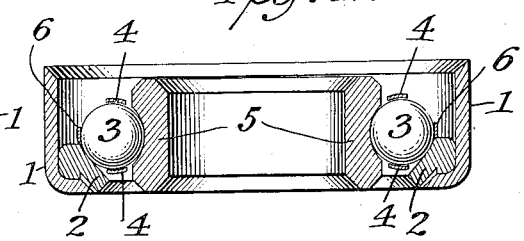
Fig. 2.   Fig. 5.
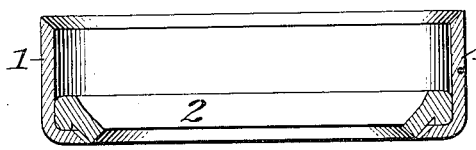 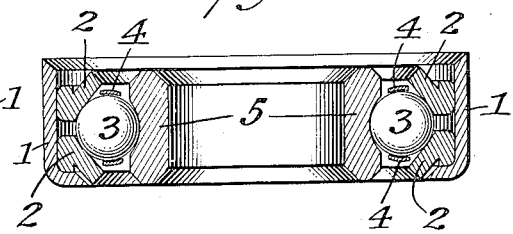
Fig. 3.   Fig. 6.
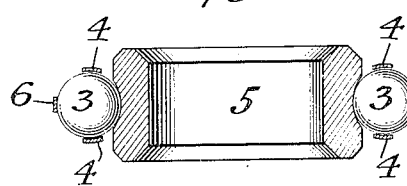 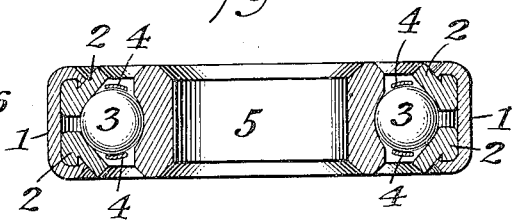
Witnesses:  Inventor
A. R. Appleman  John W. Schatz
F. M. Osenbach  By his Attorney
  Phillips Abbott

UNITED STATES PATENT OFFICE.

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

METHOD OF ASSEMBLING THE PARTS COMPOSING BALL-BEARINGS.

1,176,170.  Specification of Letters Patent.  Patented Mar. 21, 1916.

Application filed April 29, 1915. Serial No. 24,664.

*To all whom it may concern:*

Be it known that I, JOHN W. SCHATZ, a citizen of the United States, and a resident of the city of Poughkeepsie, county of Dutchess, and State of New York, have discovered an Improved Method of Assembling the Parts Composing Ball-Bearings, of which the following is a specification.

This invention is particularly applicable to bearings of the class of which an example is that patented in and by United States Letters Patent, No. 1,073,529 dated September 16, 1913, on an application filed by me.

The results I secure by my new method are important because marked economy in time and superior accuracy in assemblage are secured and the danger of distortion of the parts because of faulty assemblage or adjustment is avoided. In this specification I shall illustrate and describe my invention as practised in connection with the bearing patented to me and others in and by the patent above referred to, but I wish it understood that my invention is applicable to many other bearings in which the parts are of such construction as that similar steps or acts are performed during their assemblage.

In the drawings hereof Figure 1 is a sectional view of the outer or inclosing jacket as it appears prior to the turning in of its edges for the confinement of the race rings, balls, etc.; Fig. 2 is a view of the jacket as shown in Fig. 1, plus the addition of one of the race rings; Fig. 3 is a sectional view, the balls being shown in elevation, showing the inner race, with the balls and ball spacer assembled together and in position ready for insertion in the jacket; in this figure also I show in section a supplemental device, which at times may be useful as an aid to the operations; Fig. 4 is a sectional view, the balls being in elevation, showing the parts illustrated in Figs. 2 and 3 assembled; Fig. 5 is a sectional view, the balls being in elevation, illustrating the parts shown in Fig. 4 with the second race ring in position within the jacket; Fig. 6 is a sectional view, the balls being in elevation, of a completed bearing in which all parts are in position and the edges of the jacket turned inwardly securely confining them.

In the drawings, 1 represents the jacket prior to the turning in of its edges, 2 the race rings, 3 the balls, 4 the spacer, 5 the inner race.

The parts being as illustrated, the steps or acts performed in the assemblage of the bearing are as follows: The jacket 1 is placed upon a suitable support, as, for example, a bench or table. One of the outer race rings 2 is then placed within the jacket and pressed to position, as illustrated in Fig. 2. I say pressed because in making such bearings all parts preferably fit snugly together and they usually require more or less pressure to force them into their proper relative positions. The inner race 5 is then suitably supported and the spacer 4 is placed over it so that it will encircle it upon all sides. It will be convenient to have a suitable ledge or support for the spacer to rest upon so as to locate and maintain it in the desired relation to the inner race. The balls 3 are then placed in the recesses or pockets in the spacer. This can be quickly done by simply pushing them into said pockets and I prefer to make the pockets of such exact construction that in introducing the balls there shall be a very slight frictional contact, which, however, can be readily overcome by pressure of one's fingers until the balls are entirely within the spacer, when they will revolve freely, because if so, then the balls will be held by this slight frictional contact and will not drop out. If, however, the spacer be so constructed that the slight frictional contact referred to be not present, then the size or relation of the spacer to the balls may be such as to effect the same result, or if not, then a supplemental ball-holding device, illustrated in Figs. 3 and 4 at 6, or other suitable device, may be employed. A convenient form for this device will be a thin resilient metallic or equivalent split or open ring, which preferably is not continuous or complete, but has a substantial gap in it through which to insert the balls, the ring being moved from pocket to pocket of the spacer as the balls are successively introduced. Its resiliency will be such as to retain the balls in position. Obviously the balls may be properly assembled with the inner race by the employment of the resilient ring referred to, if there be no spacer employed. This may sometimes be convenient. When all the balls have been inserted, then the entire assemblage of parts shown in Fig. 3, that is to say, the inner race, the spacer, the balls and the ball-confining ring 6, if it be used, is bodily lifted and placed within the jacket as shown in Fig. 4. The ball confining ring 6 is now removed, which can be done without disturbing the balls, as, for instance, by slight pressure with one hand upon the spacer 4 while the ring 6 is picked out from the jacket, suitable tweezers, or other implement being used, if desired. Thereupon the second outer race ring 2 is pressed into place as shown in Fig. 5, following which the jacket 1 is firmly swaged, spun, or otherwise pressed down upon the race rings and its edges turned, spun, swaged, or pressed inwardly against the outer surface of the race rings, thus completing the operations, as shown in Fig. 6.

It will be apparent to those who are familiar with such matters that the method of assembling the parts described by me effects material saving and results in substantial advantages, particularly in the case of relatively small size bearings, because when the parts are small and the space within the jacket contracted, it is difficult to support the spacer and inner race and introduce the balls and make careful inspection of the structure to see that everything is in proper place prior to the forcing in of the second outer race ring, lest some injury to some part and its distortion result. Under my process all the work is straightforward and open and so to speak done, as the factory phrase is, "from the outside," with abundance of space and freedom from all minute and careful adjustment and inspection.

I claim:

1. The described method of assembling a bearing of the class stated consisting in partly assembling the outer race, assembling the inner race, balls and spacer as a unit, temporarily confining the balls, adjusting the inner race, balls and spacer to the partly assembled outer race, removing the temporary ball confiner, completing the assemblage of the outer race and binding the whole into a self-contained and self-supporting ball bearing unit.

2. The described method of assembling a bearing of the class stated consisting in partly assembling the outer race, assembling the inner race with its balls and temporary confiner for the balls, and adjusting the inner race and the balls to the partly assembled outer race, removing the temporary ball confiner, completing the assemblage of the outer race, and binding the whole into a self-contained, self-supporting ball bearing unit.

3. The described method of assembling the balls with one of the races in a ball bearing, consisting in properly arranging the balls in the race and holding them as so assembled by a removable temporary confiner, which engages with that part of the surface of the balls which is not in contact with any permanent part of the bearing.

In testimony whereof I have signed my name to this specification.

JOHN W. SCHATZ.

Copies of this patent may be obtained for five cents each, by addressing the "Commissioner of Patents, Washington, D. C."